May 12, 1964
E. E. REESE
3,132,368
WINDSHIELD WIPER BLADE ASSEMBLY
Filed March 29, 1962
2 Sheets-Sheet 1
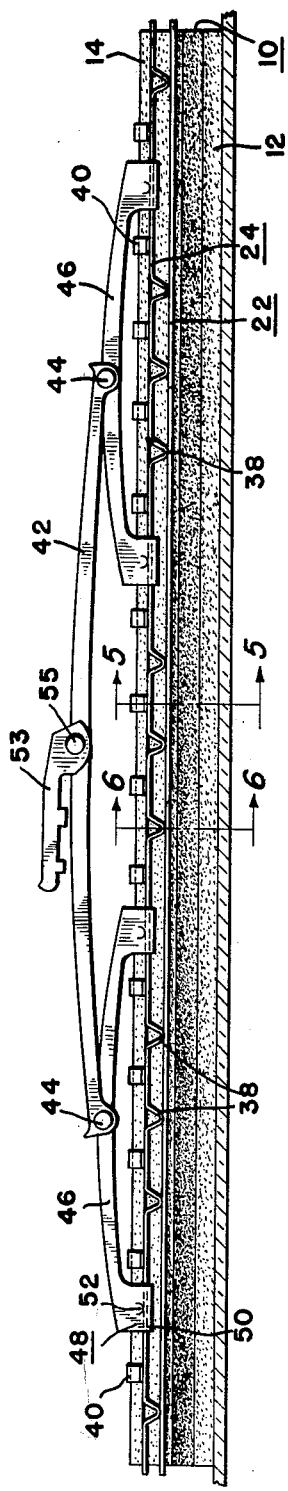
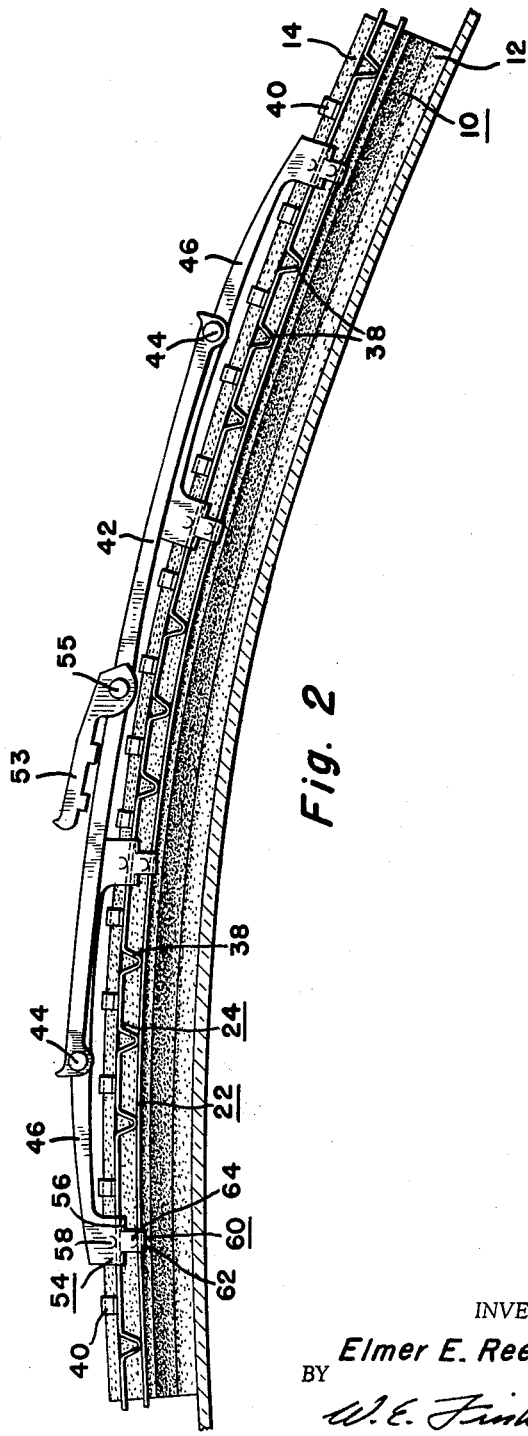
INVENTOR.
Elmer E. Reese
BY
*W. E. Finkler*
His Attorney May 12, 1964  E. E. REESE  3,132,368
WINDSHIELD WIPER BLADE ASSEMBLY
Filed March 29, 1962  2 Sheets-Sheet 2
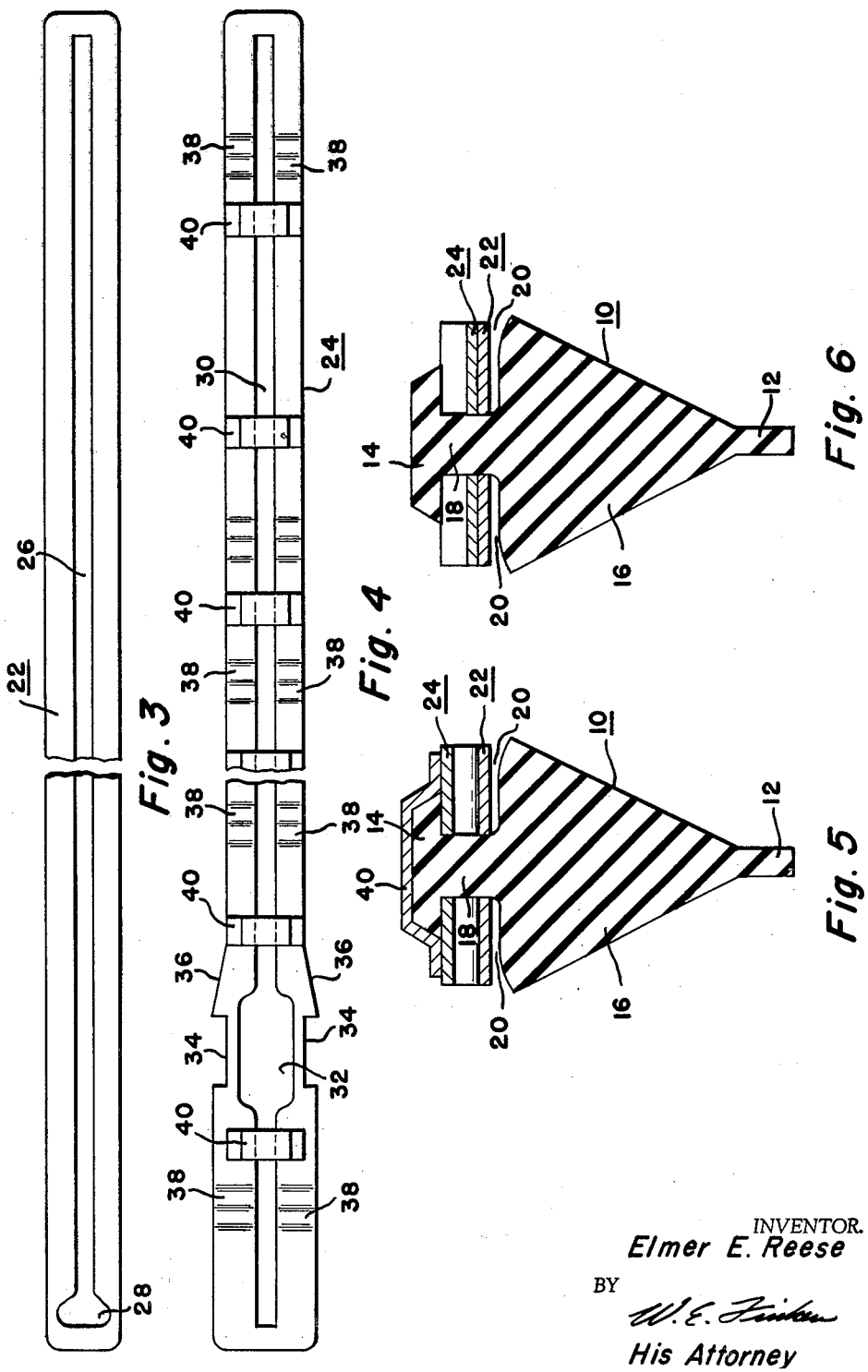
INVENTOR.
Elmer E. Reese
BY
His Attorney United States Patent Office 3,132,368
Patented May 12, 1964

3,132,368
WINDSHIELD WIPER BLADE ASSEMBLY
Elmer E. Reese, Rochester, N.Y., assignor to General Motors Corporation, Detroit, Mich., a corporation of Delaware
Filed Mar. 29, 1962, Ser. No. 183,504
12 Claims. (Cl. 15—250.42)

This invention pertains to windshield wiper blades, and particularly to an improved wiper blade assembly for wiping flat as well as curved surfaces.

Heretofore, it has been the practice to employ a squeegee unit which is substantially freely flexible in a plane normal to the surface to be wiped while being substantially inflexible in a plane parallel to such surface in wiper blades designed for wiping flat and curved surfaces. This type of squeegee unit comprises an elongate, elastomeric wiping element which is carried by an elongate backing strip, the backing strip being freely flexible in only a single plane. Various types of pressure applying superstructures have been used in combination with a squeegee unit of the aforesaid type and these superstructures comprise either a plurality of pivotally interconnected levers, or a combination of pivotally interconnected yokes and levers. However, one of the problems attendant with an increase in wiper blades to lengths of eighteen inches is that of the limited number of pressure points which can be obtained from any known pressure applying superstructure since if the spans between pressure points are too long, insufficient pressure is available for conforming the squeegee unit in the area midway between the spans.

The present invention relates to an improved wiper blade assembly wherein the number of pressure points is not determined by the number of yokes or levers in the superstructure, but rather by a secondary backing strip having spaced rigid and flexible sections whereby the number of pressure points acting on the primary backing strip can be increased at will. Accordingly, among my objects are the provision of an improved flexible windshield wiper blade assembly; the further provision of an improved squeegee unit for flexible wiper blade assemblies; and the still further provision of a flexible wiper blade assembly including primary and secondary backing strips, the secondary backing strip having spaced rigid and flexible sections, the flexible section constituting pressure points for the primary backing strip.

The aforementioned and other objects are accomplished in the present invention by providing a plurality of spaced, downward projections on the secondary backing strip, which secondary projections engage a primary backing strip so as to be capable of transmitting pressure thereto. Specifically, the improved wiper blade assembly includes an elongate elastomeric wiping element having a wiping lip along one edge and a retention portion along the opposite edge. The wiping body which terminates in the wiping lip is connected to the retention portion by a relatively thin neck formed by a pair of longitudinally extending grooves. The primary backing strip comprises an elongate flexible member having a medial slot terminating short of its ends for receiving the aforesaid neck on the wiping element, and the secondary backing strip likewise has a medial slot terminating short of its ends for receiving the thin neck on the wiping element, the secondary backing strip being superposed on the primary backing strip. The secondary backing strip has a plurality of downwardly extending projections which engage the primary backing strip at spaced intervals. In order to render spaced sections of the secondary backing strip rigid, a plurality of cross straps are formed on the secondary backing strip, which cross straps overlie the retention portion of the wiping element.

In one embodiment of the present invention, the secondary backing strip is detachably connected to a pressure applying superstructure at a plurality of longitudinally spaced apart points. In a second embodiment the pressure applying superstructure is connected at a plurality of longitudinally spaced points to both the primary and the secondary backing strips. Any known type of pressure applying superstructure is comprehended by the present invention which includes a plurality of relatively movable members having their free ends arranged to apply pressure to a backing strip. It will be appreciated that in the instant wiper blade assembly arm pressure cannot only be applied directly to the primary backing strip by the superstructure, as in the second embodiment, but also by each downward projection on the primary backing strip so any desired number of pressure points can be obtained in the wiper blade assembly.

Further objects and advantages of the present invention will be apparent from the following description, reference being had to the accompanying drawings, wherein preferred embodiments of the present invention are clearly shown.

In the drawings:

FIGURE 1 is a longitudinal view of a wiper blade constructed according to the first embodiment of the present invention.

FIGURE 2 is a longitudinal view of a wiper blade assembly constructed according to the second embodiment of the present invention shown engaging a curved surface.

FIGURE 3 is a fragmentary, plan view of a typical primary backing strip.

FIGURE 4 is a fragmentary, plan view of the secondary backing strip.

FIGURES 5 and 6 are enlarged sectional views taken along lines 5—5 and 6—6, respectively, of FIGURE 1.

With reference to FIGURE 1, in one embodiment of the present invention, the improved windshield wiper blade assembly comprises a rubber, or rubber-like, wiping element 10 having a wiping lip 12 along one edge and a retention portion 14 along the opposite edge. As seen in FIGURES 5 and 6, the wiping lip 12 is integral with a wiping body 16 which is wedge-shaped in cross section, the wiping body being connected to the retention portion 14 by a relatively thin neck 18 which permits flexure, or lengthwise pivotal movement, of the wiping body 16 relative to the retention portion 14. This longitudinal pivotal movement enables the wiping lip to assume a drag position for proper squeegeeing action as it is moved across the surface to be cleaned. The thin neck 18 is formed in the wiping element 10 by a pair of coplanar grooves 20 which extend throughout the length of the wiping element 10.

The wiping element 10 is supported by a backing strip assembly comprising a primary backing strip 22 and a superposed secondary backing strip 24. The backing strips may be composed of any suitable resiliently flexible material, such as spring metal or a plastic having the requisite physical properties, portions of both of the backing strips 22 and 24 being disposed in the coplanar grooves 20 of the wiping element 10. As seen in FIGURE 3, a primary backing strip 22 comprises an elongate member having a central elongate slot 26 terminating short of its ends with an enlarged entrance opening 28 adjacent one end thereof. The enlarged entrance opening 28 is of a size sufficient to accommodate the retention portion 14 to facilitate assembly of the primary backing strip 22 with the wiping element 10. The primary backing strip 22 is substantially freely and uniformly flexible in one plane, namely a plane normal to the surface to be wiped, but by reason of having a greater width than thickness is substantially rigid in a plane parallel to the surface to be wiped. Thus, the primary backing strip 22, when assembled with the wiping element 10, forms a squeegee unit which has the requisite lateral stability, that is, the squeegee unit is substantially inflexible in a plane parallel to the surface to be cleaned while being flexible in a plane normal to the surface to be wiped so as to be capable of conforming to a curved windshield surface.

As seen in FIGURE 4, the secondary backing strip 24 is likewise of greater width than thickness and has a closed central slot 30 with an intermediate enlargement 32 aligned with marginal notches 34. The marginal edges of the backing strip are tapered at 36 leading to the notches 34 for a purpose to be described hereinafter. The enlargement 32 is likewise of sufficient width to accommodate the retention portion 14 of the wiping element during assembly of the secondary backing strip therewith. In addition, the secondary backing strip 24 has a plurality of downwardly, substantially V-shaped projections 38 in each rail thereof, which downward projections 36 are spaced throughout the length of the secondary backing strip. Intermediate the downward projections 38, the side rails are interconnected by cross straps 40. If, as shown in FIGURE 5, the secondary backing strip is composed of spring metal, the cross straps 40 are secured to the side rails by welds, or other suitable bonding means. However, if the secondary backing strip is composed of molded plastic, the cross straps 40 can be integral with the side rails.

The cross straps 40 provide rigidity for spaced portions of the secondary backing strip 24 in a plane normal to the surface to be wiped. That is, the areas of the side rails which are interconnected by the cross straps 40 are substantially rigid in all directions. However, those portions of the secondary backing strip having the downward projections 38, and the adjacent immediately contiguous areas are flexible in a plane normal to the surface to be wiped. Therefore, the secondary backing strip 24 comprises adjacent rigid and flexible sections. Moreover, any convenient number of flexible and rigid sections can be embodied in the secondary backing strip in accordance with the desired number of pressure points required on the primary backing strip to apply substantially uniform pressure to the wiping elements to conform it to a given curvature. In addition, the downward projections 38 maintain the primary and secondary backing strips in uniformly spaced-apart relation.

Referring again to FIGURE 1, in the first embodiment the secondary backing strip 24 is connected at four longitudinally spaced points to an arm-pressure applying superstructure. As disclosed, this pressure applying superstructure comprises a channel-shaped primary yoke 42, opposite ends of which are connected by pivots 44 to channel-shaped secondary yokes 46. Each end of each secondary yoke has a claw 48 formed by inwardly flanged edges 50 and arcuate dimples 52 for straddling a portion of the secondary backing strip 24. The claw construction on the secondary yokes is of the type disclosed in copending application Serial No. 83,004 filed January 16, 1961, in the name of Latone et al., and assigned to the assignee of the present invention. Thus, the pressure applying superstructure is connected to the secondary yoke at four longitudinally spaced apart points, for receiving arm pressure through a conventional clip 53 pivoted at 55 along the axis transverse to the longitudinal axis of the wiper blade assembly.

In the first embodiment, the claws on the free end of the pressure applying superstructure directly engage only the secondary backing strip, and pressure is transmitted to the primary backing strip 22 through the downward projections 38 which engage the side rails of the primary backing strip 22 at spaced intervals. In the particular wiper blade assembly shown in FIGURE 1, pressure is applied to the primary backing strip 22 at eleven longitudinally spaced points. Thus, rather than having arm applied pressure divided and applied to the squeegee assembly at only four points, as would be the case without using the secondary backing strip 24, by using a secondary backing strip constructed according to the present invention wiper arm pressure can be divided and applied at any desired number of spaced points throughout the length of the squeegee unit, and thus obtain any desired distribution of arm pressure throughout the length of the squeegee.

With reference to FIGURE 2, in the second embodiment of the improved windshield wiper blade assembly all components thereof are identical except for the claws on the ends of the pressure applying superstructure. Thus, in FIGURE 2 the ends of the secondary yokes 46 are formed with double claw assemblies, the upper claw 54 comprising spaced inwardly flanged ears 56 and a dimple 58, and the lower claw 60 comprising an inwardly flanged edge 62 and a dimple 64. The upper claw 54 engages the side rails of the secondary backing strip 24, and the lower claw 60 engages the side rails of the primary backing strip 22. In this manner, the number of pressure applying points can be increased by the number of free ends on the pressure applying superstructure, and thus, as shown in FIGURE 2 the squeegee unit has pressure applied thereto at fifteen longitudinally spaced apart points throughout its length.

In both embodiments of the present invention, the pressure applying superstructure is detachably connected to only the secondary backing strip 24, this connection being of the general type disclosed in copending application Serial No. 82,810, filed January 16, 1961, in the name of Latone and assigned to the assignee of the present invention. Thus, the heel end claw of the pressure applying superstructure is adapted to engage the marginal notches 34 of the side rail and the secondary backing strip 24. This connection can be quickly effected by a mere relative longitudinal movement between the superstructure and the squeegee unit, since as the heel end claw engages the tapered marginal edges 36 it will compress the secondary backing strip in the area of the enlarged slot 32 to permit entry of the end claw into the marginal notches 34. Sufficient lost motion is provided by having the marginal notches 34 of greater longitudinal extent than the heel end claws whereas the other claws of the superstructure slidably engage the secondary backing strip. To disassemble the superstructure from the squeegee unit, for replacement purposes, it is only necessary to compress the side rails of the secondary backing strip in the area of the enlarged slot 32 and effect reverse relative longitudinal movement of the superstructure and the squeegee unit.

While the embodiments of the invention as herein disclosed constitute preferred forms, it is to be understood that other forms might be adopted.

What is claimed is as follows:

1. A squeegee unit including, an elongate elastomeric wiping element having a wiping lip along one edge and a retention portion along the opposite edge, and an elongate backing assembly engaging said retention portion comprising a primary backing strip substantially freely flexible in a plane normal to a surface to be wiped and a superposed secondary backing strip having a plurality of spaced rigid sections with flexible sections therebetween, said flexible sections engaging said primary backing strip at a plurality of longitudinally spaced apart points for applying conforming pressure thereto.

2. A squeegee unit including, an elongate elastomeric wiping element having a wiping lip along one edge and a retention portion along the opposite edge, and an elongate backing assembly supported by said retention portion comprising a primary backing strip substantially uniformly flexible in a plane normal to a surface to be wiped and a superposed secondary backing strip having a plurality of spaced apart rigid sections and a plurality of flexible sections disposed therebetween, each flexible section having a downward projection in engagement with said primary backing strip to apply conforming pressure thereto at a plurality of longitudinally spaced apart points.

3. A squeegee unit including, an elongate elastomeric wiping element having a wiping lip along one edge and a retention portion along the opposite edge, and an elongate backing assembly supported by said retention portion comprising a primary backing strip substantially freely flexible in a plane normal to a surface to be wiped and a superposed secondary backing strip having a plurality of longitudinally spaced apart rigid sections and flexible sections disposed therebetween, said rigid sections being formed by cross straps, and each flexible section having downward projections engaging said primary backing strip for applying conforming pressure thereto at a plurality of longitudinally spaced apart points.

4. A squeegee unit including, an elongate elastomeric wiping element having a wiping lip along one edge and a retention portion along the opposite edge, and an elongate backing assembly supported by said retention portion comprising a primary backing strip substantially freely flexible in a plane normal to a surface to be wiped and a superposed secondary backing strip having a plurality of longitudinally spaced apart rigid sections and flexible sections disposed therebetween, said primary and secondary backing strips having elongate closed central slots forming a pair of side rails, said rigid sections being formed by cross straps interconnecting the side rails of the secondary backing strip, and each flexible section of the secondary backing strip having downward projections depending from the side rails thereof and engaging the side rails of the primary backing strip to apply conforming pressure thereto at a plurality of longitudinally spaced apart points.

5. A subassembly for a flexible wiper blade including, a backing assembly comprising an elongate primary backing strip substantially freely and uniformly flexible in a single plane and a superposed secondary backing strip having a plurality of longitudinally spaced apart rigid sections and flexible sections disposed therebetween, each flexible section having projecting means thereon engaging said primary backing strip at a plurality of longitudinally spaced points, and a pressure applying superstructure connected to said secondary backing strip at a plurality of longitudinally spaced apart points.

6. A subassembly for a flexible wiper blade including, a backing assembly comprising an elongate primary backing strip substantially freely and uniformly flexible in a single plane, and a superposed secondary backing strip having a plurality of longitudinally spaced rigid sections and flexible sections disposed therebetween, each flexible section having projecting means engaging said primary backing strip at a plurality of longitudinally spaced points, and a pressure applying superstructure connected to said primary and secondary backing strips at a plurality of longitudinally spaced apart points.

7. A subassembly for a flexible wiper blade including, a backing assembly comprising an elongate primary backing strip substantially freely and uniformly flexible in a single plane and a superposed secondary backing strip having a plurality of longitudinally spaced rigid sections and flexible sections disposed therebetween, said primary and secondary backing strips having coplanar side rails, each flexible section of said secondary backing strip having projecting means engaging said primary backing strip at a plurality of longitudinally spaced points, and a pressure applying superstructure comprising a plurality of relatively movable members having free ends, each free end of said members having superposed claws adapted to straddle the side rails of said primary and secondary backing strips at a plurality of longitudinally spaced apart points.

8. The subassembly set forth in claim 7 wherein each superposed claw comprises a pair of spaced inwardly flanged ears and dimples for engaging the secondary backing strip, and a pair of inwardly flanged edges and dimples for engaging the primary backing strip.

9. A flexible wiper blade assembly including, an elongate elastomeric wiping element having a wiping lip along one edge and a retention portion along the opposite edge, a backing assembly supported by said retention portion comprising a primary backing strip substantially freely flexible in a plane normal to a surface to be wiped and a superposed backing strip having a plurality of longitudinally spaced rigid sections and a plurality of flexible sections disposed therebetween, each flexible section having depending projection means engaging said primary backing strip, and a pressure applying superstructure connected to said backing assembly at a plurality of longitudinally spaced apart points for applying arm pressure thereto, the arm pressure applied by each connection between the backing assembly and the pressure applying superstructure being divided by the secondary backing strip and applied to said primary backing strip at a plurality of longitudinally spaced apart points for conforming the wiping element to the surface to be wiper.

10. A flexible wiper blade assembly including, an elongate elastomeric wiping element having a wiping lip along one edge and a retention portion along the opposite edge, a backing assembly supported by said retention portion for imparting lateral stability to said wiping element comprising a primary backing strip substantially freely flexible in a plane normal to a surface to be wiped and a superposed secondary backing strip having a plurality of longitudinally spaced rigid sections and flexible sections disposed therebetween, each flexible section having downward projecting means engaging said primary backing strip, and a pressure applying superstructure comprising a plurality of relatively movable members having their free ends connected to said backing assembly at a plurality of longitudinally spaced apart points for applying arm pressure thereto, the arm pressure applied by the members of said pressure applying superstructure being subdivided by the secondary backing strip applied to said primary backing strip at a plurality of longitudinally spaced apart points.

11. The wiper blade assembly set forth in claim 10 wherein the free ends of the members of the pressure applying superstructure are connected only to longitudinally spaced points on the secondary backing strip.

12. A flexible wiper blade assembly including, an elongate elastomeric wiping element having a wiping lip along one edge and a retention portion along the opposite edge, a backing assembly supported by said retention portion for imparting lateral stability to said wiping element comprising a primary backing strip substantially freely flexible in a plane normal to a surface to be wiped, a superposed secondary backing strip having a plurality of longitudinally spaced rigid sections with flexible sections disposed therebetween, each flexible section having downwardly projecting means engaging said primary backing strip, and a pressure applying superstructure comprising a plurality of relatively movable members having their free ends connected to both the primary and secondary backing strips at a plurality of longitudinally spaced apart points for applying wiper arm pressure thereto, the arm pressure applied by said pressure applying superstructure being subdivided by the secondary backing strip and applied to said primary backing strip at a plurality of longitudinally spaced apart points.

References Cited in the file of this patent

UNITED STATES PATENTS 3,006,018    Golub et al. _____ Oct. 31, 1961

FOREIGN PATENTS 1,241,922    France _____ Aug. 16, 1960